(12) United States Patent
Medel et al.

(10) Patent No.: US 8,240,969 B2
(45) Date of Patent: Aug. 14, 2012

(54) CARGO TRAIN WAGON FOR THE TRANSPORTATION OF BULK MATERIAL

(75) Inventors: Marco Medel, Antofagasta (CL); Mauricio Medel, Antofagasta (CL); Manuel Medel, Antofagasta (CL); Matias Medel, Antofagasta (CL)

(73) Assignee: Duratray Ltda., Antofagasta (CL)

( * ) Notice: Subject to any disclaimer, the term of this patent is extended or adjusted under 35 U.S.C. 154(b) by 568 days.

(21) Appl. No.: 12/200,198

(22) Filed: Aug. 28, 2008

(65) Prior Publication Data
US 2010/0054898 A1 Mar. 4, 2010

(51) Int. Cl.
*B60P 1/04* (2006.01)
(52) U.S. Cl. ..... 414/470; 414/393; 414/421; 296/183.2; 298/18
(58) Field of Classification Search .................. 414/332, 414/339, 393, 421, 470; 296/183.2
See application file for complete search history.

(56) References Cited

U.S. PATENT DOCUMENTS

| 4,242,031 | A | * | 12/1980 | McMullen | 414/470 |
| 4,453,875 | A | * | 6/1984 | Johnson, Sr. | 414/304 |
| 6,068,927 | A | * | 5/2000 | Stenman | 428/409 |
| 6,905,175 | B1 | * | 6/2005 | Verros | 298/17.7 |
| 7,025,407 | B2 | * | 4/2006 | Medel | 296/183.2 |

* cited by examiner

*Primary Examiner* — Scott Lowe
(74) *Attorney, Agent, or Firm* — Millen, White, Zelano, Branigan, P.C.

(57) ABSTRACT

Cargo wagon to transport bulk material in different conditions which allows the load not to attach itself to the surface of the wagon, speeding up the unloading process, wherein said cargo wagon is formed by a defined structure which vertebral frame is conformed by a longitudinal beam, where in a transversal way to such beam ribs have been configured in a semi-rectangular shape which give the volume configuration to the wagon's load; in the Terminal ends of such ribs there are lateral beams that give firmness to the structures that define the ribs; said lateral beams have on their interior end steel plates along their whole longitude that conform an upper lateral end of the wagon; where in said steel plates and in suspended form there are a series of ropes over which there is rubber carpet in suspended form that defines the structure to receive the load.

16 Claims, 5 Drawing Sheets

CARGO TRAIN WAGON FOR THE TRANSPORTATION OF BULK MATERIAL

The current invention relates to a train wagon for the transportation of bulk material. Specifically, it relates to a train wagon which supportive structure is made of steel and the loading volume is of suspended rubber over flexible elements attached to the steel supportive structure. Such flexible structures allow the floor of the cart to support itself on to the same and, likewise, generate the required flexibility to absorb the load's impact as well as the required to remove the load adhered to the cart.

PREVIOUS ART

Historically, train cargo wagons are configured by steel structures that conform an open box in its upper end to receive the material to be transported. The mining industry is no exception in the use of these types of train wagons, especially those referring to the transportation of minerals to the treatment plant, either through hydrometallurgical or pyrometallurgical means.

Train wagons are conformed in such way that the load can be collected basically in three ways. The most common is for the wagon to be a static box in which by means of shovels or loaders the material is removed from its interior. There is also another modality in which the cart, on one of its side, is incorporated with a mobile lockgate that allows the material to leave the box by gravity. The last modality is of wagons with pivoting mechanisms that by means of hydraulic devices lift an end of the wagon provoking the overturning out of the contents contained within.

The problems evidenced in the above mentioned alternatives have the inconvenience of being very rigid structures and of great tare, which leads to a decrease in the load capacity or having to count with engines of great power to move the same number of carts. Additionally, when removing the load from the wagons, a carry back effect is produced, which consists in that part of the load does not completely leave the box, remaining attached to the inferior surface of the wagon. This is not a minor problem since the intervention of machines and operators is required to remove the entire load. The previously described phenomenon is also produced in works where the temperatures are low due to the freezing of the load since the material, upon receiving low temperatures, radiates the cold towards the material.

The most recent developments to solve the above-mentioned problems point towards the development of train wagons which boxes are designed with a rubber carpet attached over the metallic floor of the box. Patent DE 202005002765U describes a chassis with a superstructure in the form of a box for bulk solids with a mobile access side, this is, a lockgate to load and unload. Its loading floor is angled disposed regarding the horizontal and with vibrating elements during the unloading step and it has one or more plastic or rubber layers attached to it. Unlike the invention, this patent publication corresponds to a typical steel box with an inclined floor and a rubber carpet attached to it and the invention does not correspond to a steel metallic box but rather to a steel frame that supports a suspending rubber carpet which in turn transports the load.

Patent Publication WO 9950162 describes a wagon for mineral transportation with a load supporting surface in the shape of a receiving rubber layer secured by fixed elements to the floor of the wagon. The fixed elements can be found around the walls. The layer is not configured around the wagon in the intersection of the walls and floor, but rather only supported over two thirds of the floor in the first stage of the empty wagon. When the wagon is loaded with mineral, the layer is adjusted inside a second stage with stronger energy potential and acquiring the shape of the wagon. That is, this invention corresponds to a wagon to which a carpet has been incorporated that stretches upon receiving the load and contracts when unloaded. As well as the aforementioned case, it corresponds to a metallic box incorporated with a rubber carpet, without it being suspended.

The proposed invention presents a new concept in train wagons, consisting on a structured conformed by a steel frame that considerable diminishes the tare of the cart. A series of straps are placed transversal to the longitudinal axis on said structure, over which the rubber carpet is disposed in a suspended form with the intention of receiving the load that the wagon will transport. This configuration has the advantage of, besides reducing weight, having a low center of gravity and better stability since when the cart is loaded the carpet exercises pressure over the straps and tends to concentrate the center of gravity in the zone under the structural frame, achieving not only to increase the useful load but also achieving more security. Additionally, the fact that the loading zone is a suspended carpet, allows the material, upon moving along the train cart, to have a slight movement which, besides the typical characteristics of rubber, tends to not adhere itself to the loads surface, thus diminishing the possibility of the carry back phenomenon previously described upon unloading.

DETAILED DESCRIPTION OF THE INVENTION

Figure 1:
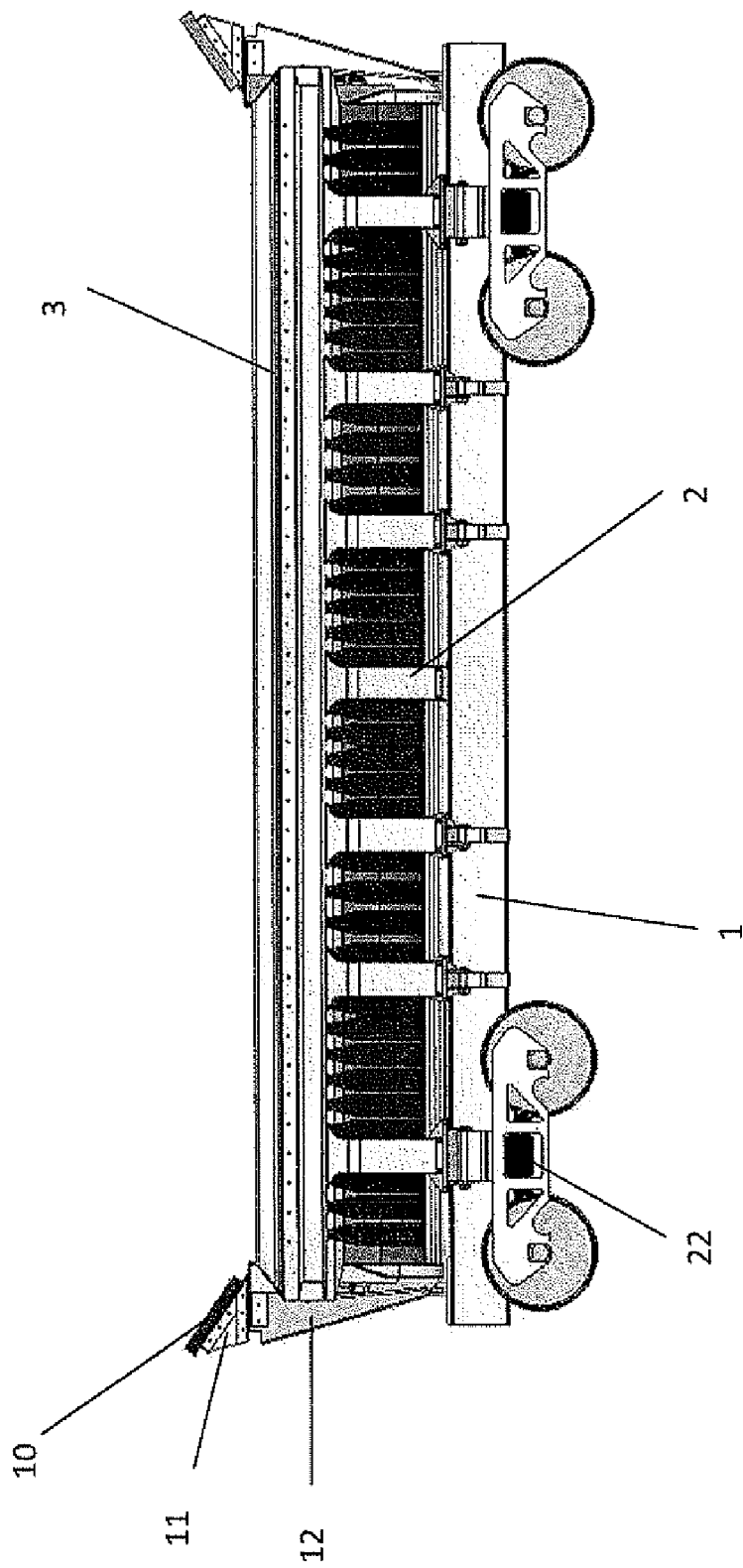
FIG. 1: represents a lateral view in elevation of the wagon of the present invention.
Figure 2:
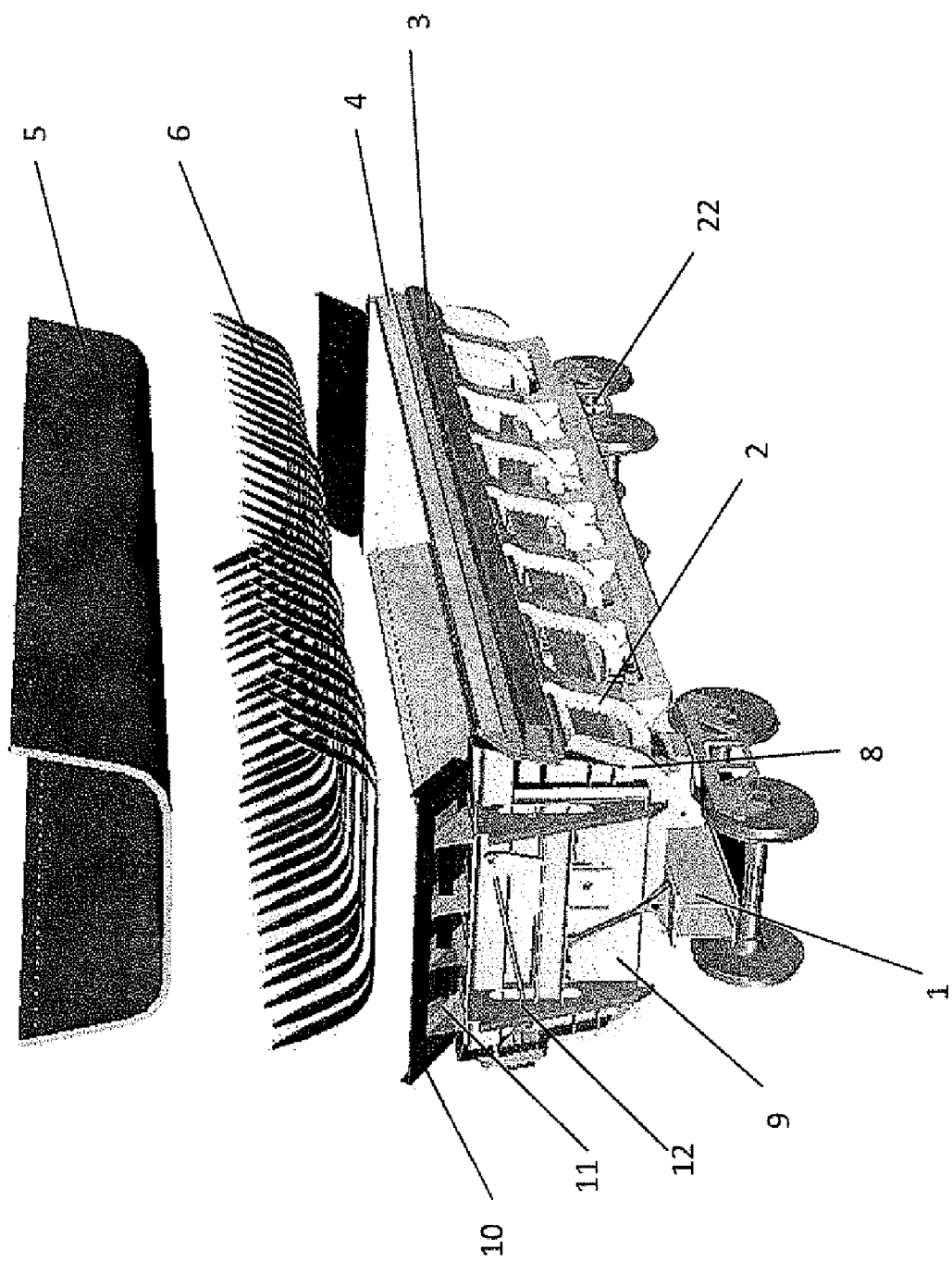
FIG. 2: corresponds to an overall explosive view of the wagon of the invention.
Figure 3:
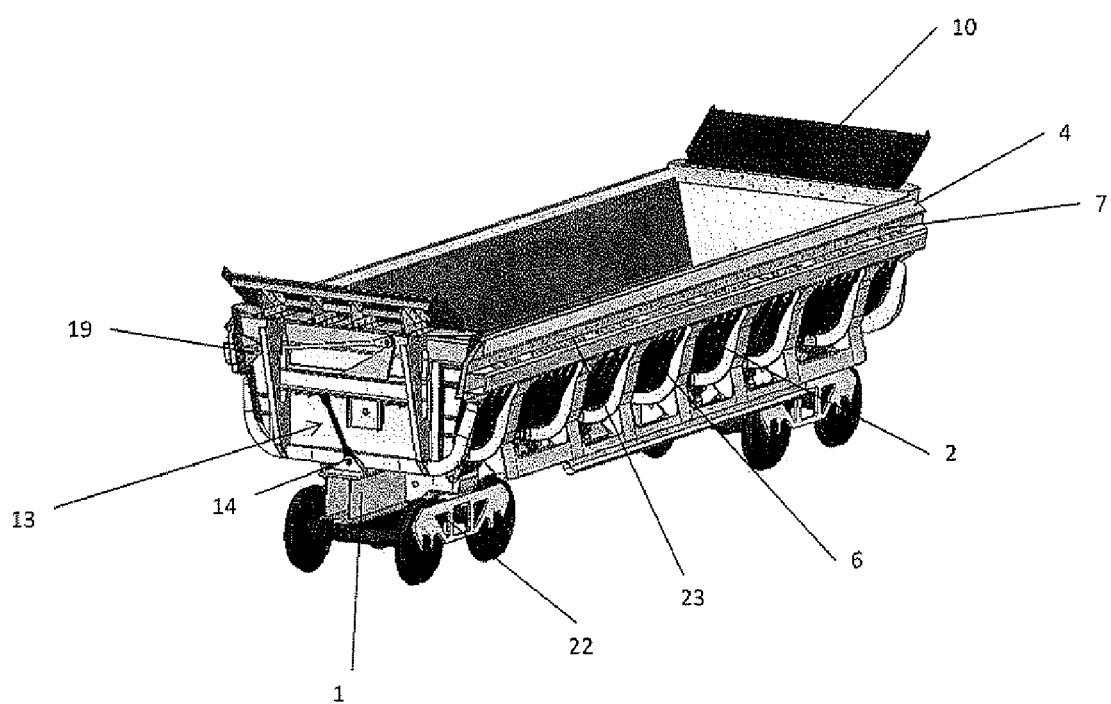
FIG. 3: corresponds to an overall view of the wagon of the present invention.
Figure 4:
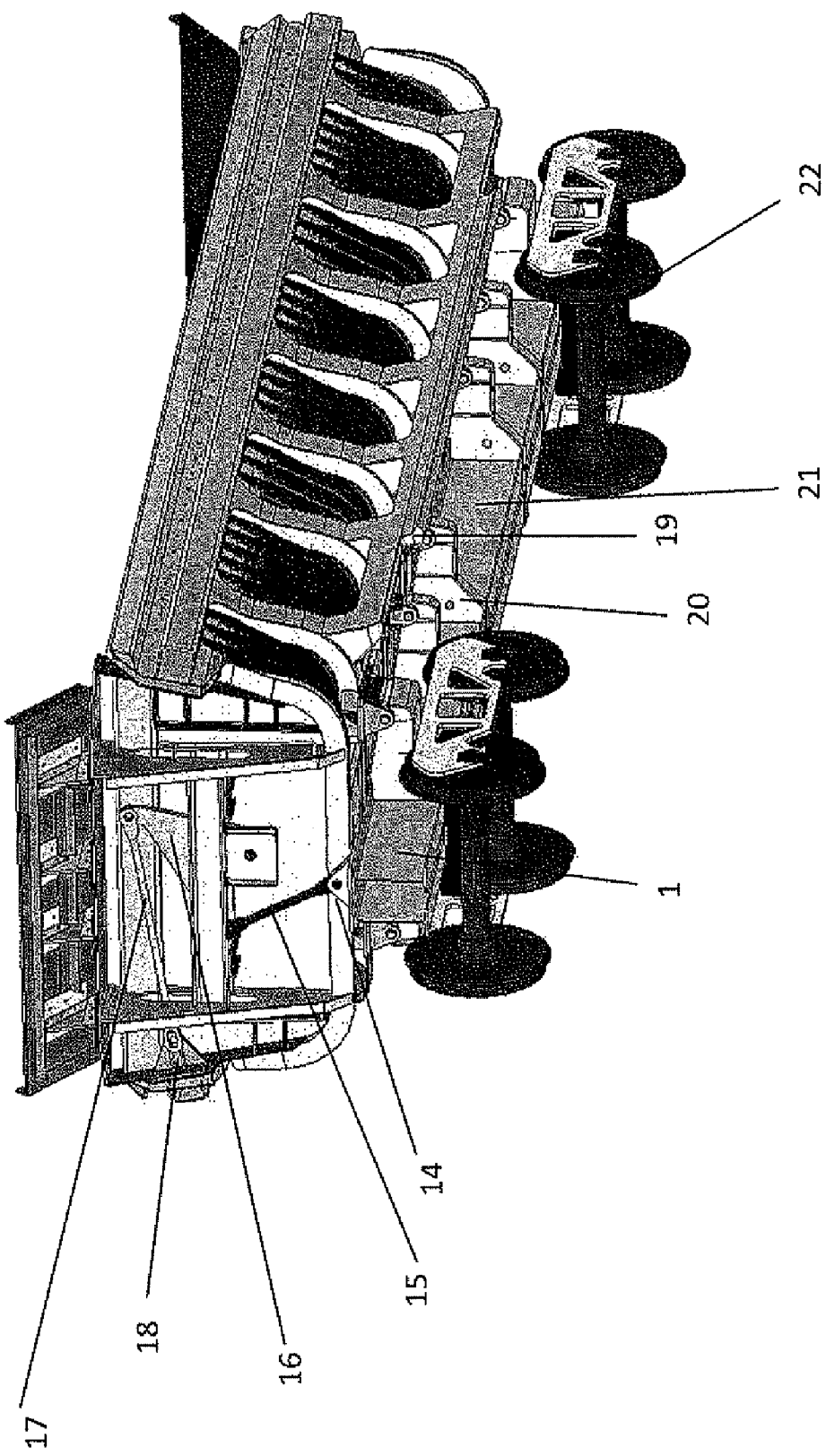
FIG. 4: corresponds to an overall view from the bottom of the wagon of the present invention.
Figure 5:
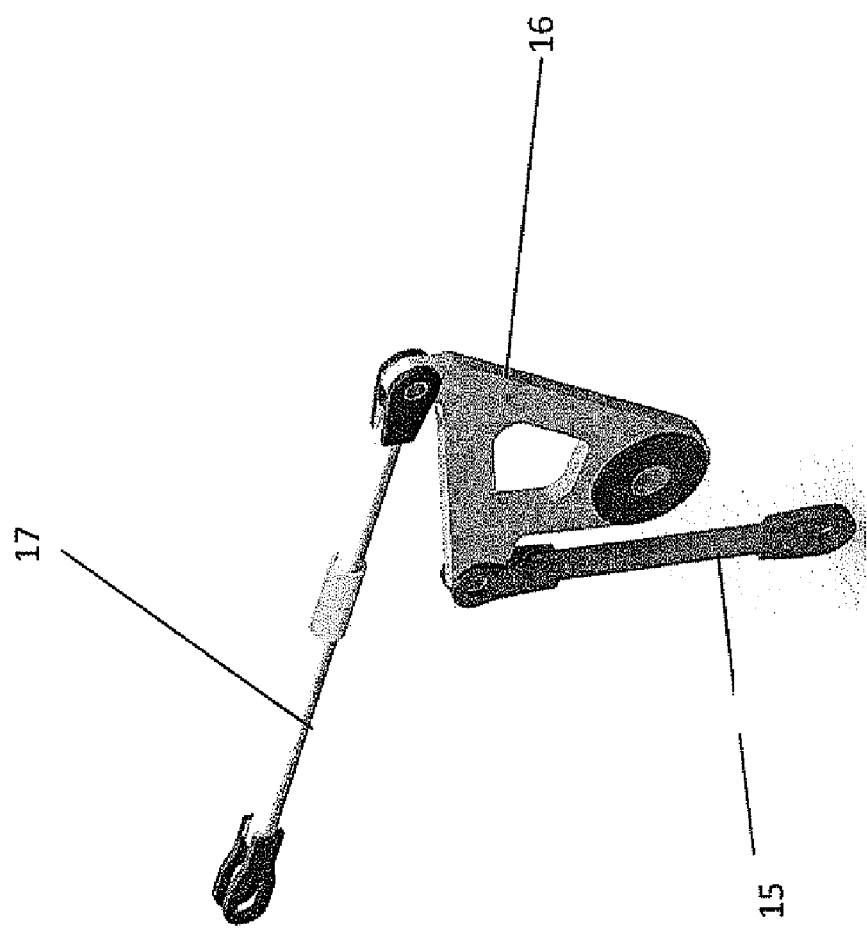
FIG. 5: corresponds to a view of the articulated arm that allows the pivoting for the unloading of the wagon.

The train wagon of this application is composed by a structure defined by a frame which backbone is conformed by a rectangular beam or double T (1) that transversal to such beam, there have been provided ribs (2) that define a semi-rectangular form that will finally give shape to the loading volume of the wagon. On the terminal ends of said ribs there are lateral beams (3) aimed to stiffen the structure defined by the ribs (2). Said lateral beams have metal plates (4) in their interior ends along the entire length that conform the upper lateral end of the wagon. The beam (1), which corresponds to a longitudinal beam in the center of the wagon, is placed over the bogies (22) disposed over the railway.

The ribs (2) are connected to the beam (1) by only one of its ends by means of a pivoting connection (19) disposed on the lower part and towards one of the sides of the lower part of each rib (2). In turn, each pivoting connection (19) is connected to the lateral support structures (20) secured to the lateral end (21) of the beam (1). This pivoting connection (19) under the ribs (2) allow the ribs to be lifted from the other side, not moving but rather turning on that point, thus producing the action of overturning the wagon.

The rubber carpet (5) which is where the load will be received is suspended over a series of ropes (6) that hang from the steel plates (4). Said ropes are secured to the steel plate (4) by means of binding clips with bolts (23), for which in the steel plates (3) there are holes (7) that have the purpose of securing the binding clips (23) of the bolts for the ropes. Even though the ropes hang from the steel plate (4) and thus also the rubber carpet (5), when the wagon is loaded the weight of the load naturally produces that the carpet and the ropes slightly pose themselves of the structural ribs (2), whereby the weight of the load is distributed on the ropes (6) as well as on the structure of the wagon, thus lightening the complete tensions of the wagon.

On the terminal ends of the longitudinal ends of the beam (1) it has configured two lateral ribs (8) intended to support the interior and rear wall of the wagon, said walls (9) correspond to the elements that together with the suspended carpet (5) define the wagon's load volume. In turn, on the upper end of said walls (9) visors have been placed (10) intended to form a type of funnel in the volume of the load. This manages that the load does not slip towards the front or rear end of the wagon.

The visors (10) are installed in an angular form over the walls (9) by means of a set of squares (11) that rest over the top part of said wall. The walls (9) are duly tightened by two sets of squares (12) intended to give firmness to such parts and thus support the compression to which they are subject to loaded. Additionally, on the exterior surface of each wall (9) the pivoting device (13) of the wagon has been configured, this pivoting mechanism is found on the bottom end attached to the longitudinal beam (1) by a perforated plate (14) that allows the articulation of the rear arm (15) of the pivoting mechanism. The pivoting device has a central element (16) that connects the rear arm (15) with the upper arm (17) thus, when the device is articulated one of the ends of the structure is lifted and the emptying of material is produced. For such purposes, the upper arm (15) on its front end is connected to one of the sides of the walls (9) by means of the articulated connection (18) and on its rear end to such central element (16). Strictly, when activating the pivoting device the lifting of the rib is produced (2), consequently the lifting of the suspended carpet and together with it the unloading of the material.

The material of the visors (10) can be composed of any polymeric material, although rubber is preferably used, with the same characteristics of the suspended carpet, since it has been shown that this material is more resistant to abrasion, especially when the transported element is concentrated mineral.

The invention claimed is:

1. A side unloading cargo wagon to transport bulk material in different conditions which allows a load not to attach itself to the surface of the wagon, speeding up the unloading process, wherein said cargo wagon comprises
    a steel structure with two side walls, two end walls, and a bottom forming a semi-rectangular shaped frame comprising a longitudinal beam and transversal beam ribs with lateral beams attached at their terminal ends; the interior end of said lateral beams have steel plates along their whole length that conform to an upper lateral end of the wagon; ropes hang from one side wall to the other side wall and are secured by the steel plates; a rubber carpet covering both sides walls and the bottom of the wagon is suspended over the ropes wherein said rubber carpet directly contacts the ropes on one side and directly receives the bulk material load on the other.

2. Cargo wagon according to claim 1 wherein the floor of the wagon comprises a rubber wear carpet of different thicknesses customized to each operation and material that allows lessening the loads impact over itself and over a metallic structure of the cart.

3. Cargo wagon according to claim 1 wherein the flexibility of the floor allows eliminating 100% of the transported load, reducing the wear of the floor due to elevated abrasion.

4. Cargo wagon according to claim 1 wherein said longitudinal beam has a rectangular or double T shape.

5. Cargo wagon according to claim 1 wherein said longitudinal beam is at the center of the wagon and it is placed over bogies in order to mount the cart on a railway.

6. Cargo wagon according to claim 1 wherein one of the ends of said longitudinal beam has a pivoting connection disposed on the bottom part of a side wall, so that the ribs may be lifted from the opposite side of the connection thus overturning the wagon and emptying the bulk material over the side wall of the cargo wagon.

7. Cargo wagon according to claim 1 wherein said ropes are secured to such, steel plate by binding clips with bolts through holes is said lateral beams.

8. Cargo wagon according to claim 1 wherein on the terminal ends of said longitudinal beam it has configured two lateral beams that support interior and rear walls of the wagon, wherein said walls correspond to the elements that together with said suspended rubber carpet define the loading volume of the wagon.

9. Cargo wagon according to claim 8 wherein on the upper end of said walls there have been configured visors aimed to form a kind of funnel in the loading volume.

10. Cargo wagon according to claim 9 wherein said visors are configured in angular form over said walls by means of a set of squares that rest over the top part of said walls.

11. Cargo wagon according to claim 9, wherein said visors are made of polymeric material.

12. Cargo wagon according to claim 9, wherein said visors are made of rubber.

13. Cargo wagon according to claim 8 wherein said walls are duly tightened by sets of squares which give firmness to the loads compression.

14. Cargo wagon according to claim 8 wherein on the outer surface of said walls a pivoting mechanism of the wagon has been configured, being such mechanism attached by its bottom end to the longitudinal beam through a perforated plate that allows the articulation of a rear arm of a pivoting device; where it also has a central element that connects an upper arm to said rear arm so that when the device is activated, one of the ends of the structure is lifted producing the emptying of the material.

15. Cargo wagon according to claim 14 wherein said upper arm, on its front end is connected to one of the sides of said walls through an articulated connection on its rear end to said central element.

16. Cargo wagon according to claim 1, wherein the ropes stretch when under tension from a load and retract when said tension is released by overturning the cargo wagon, said retraction generating a catapult effect expelling the load from the wagon.

* * * * *